United States Patent
Amauba et al.

(10) Patent No.: US 8,087,032 B2
(45) Date of Patent: Dec. 27, 2011

(54) AUTOMATED RECOVERY PROCESS INITIATION FOR DATA CONSUMERS OF A COMMON INFORMATION MODEL (CIM) MANAGED COMPONENT

(75) Inventors: Aaron Amauba, Portland, OR (US); Ross E. Hagglund, Hillsboro, OR (US); Martine B. Wedlake, Hillsboro, OR (US); Timothy J. Crawford, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 12/060,133

(22) Filed: Mar. 31, 2008

(65) Prior Publication Data
US 2009/0249361 A1 Oct. 1, 2009

(51) Int. Cl.
*G06F 13/00* (2006.01)
(52) U.S. Cl. ......... 719/317; 719/318; 709/202; 709/224
(58) Field of Classification Search ............... 719/317, 719/318; 709/202, 224
See application file for complete search history.

(56) References Cited

U.S. PATENT DOCUMENTS

| | | | |
|---|---|---|---|
| 6,775,700 B2 | 8/2004 | Cheng et al. | |
| 7,058,657 B1 | 6/2006 | Berno | |
| 7,549,124 B2 * | 6/2009 | DeLuca et al. | 715/736 |
| 7,580,994 B1 * | 8/2009 | Fiszman et al. | 709/223 |
| 7,890,622 B2 * | 2/2011 | Coca et al. | 709/224 |
| 2002/0144009 A1 | 10/2002 | Cheng et al. | |
| 2003/0105801 A1 | 6/2003 | Tse et al. | |
| 2004/0153775 A1 | 8/2004 | Bhattacharjee et al. | |
| 2005/0038791 A1 | 2/2005 | Ven | |
| 2005/0138117 A1 | 6/2005 | Chaney et al. | |
| 2005/0278354 A1 | 12/2005 | Gupta et al. | |
| 2006/0156210 A1 | 7/2006 | Ranson et al. | |
| 2006/0242284 A1 | 10/2006 | Savage | |
| 2006/0248407 A1 | 11/2006 | Adams, Jr. et al. | |
| 2006/0248539 A1 | 11/2006 | Sanghvi et al. | |

OTHER PUBLICATIONS

A. Kumar et al., "Moving from data modeling to process modeling in CIM," Integrated Network Management, 2005. IM 2005. 2005 9th IFIP/IEEE International Symposium, May 15-19, 2005 pp. 673-686.
R. Carr, "Session 1: CIM diagnostic schema and provider-consumer architecture," Intel Developer Forum, Fall 2000.
K. Carey et al., "Integrating CIM/WBEM with the Java Enterprise Model," 2007.

* cited by examiner

*Primary Examiner* — Andy Ho
(74) *Attorney, Agent, or Firm* — Steven Bennett

(57) ABSTRACT

A Common Information Model (CIM) agent notifies a CIM consumer that the CIM agent is able to receive notifications from the CIM consumer relating to errors within data relating to a CIM managed component and sent by the CIM agent to the CIM consumer. The CIM consumer receives the data relating to the CIM managed component from the CIM agent. The CIM managed component is a hardware component or a component. In response to the CIM consumer detecting that the data relating to the CIM managed component contains errors, the CIM consumer notifies the CIM agent. In response, the CIM agent initiates an automated recovery process in relation to the CIM managed component, without manual user interaction. The CIM agent may then continue to send data relating to the CIM managed component to the CIM consumer.

34 Claims, 5 Drawing Sheets

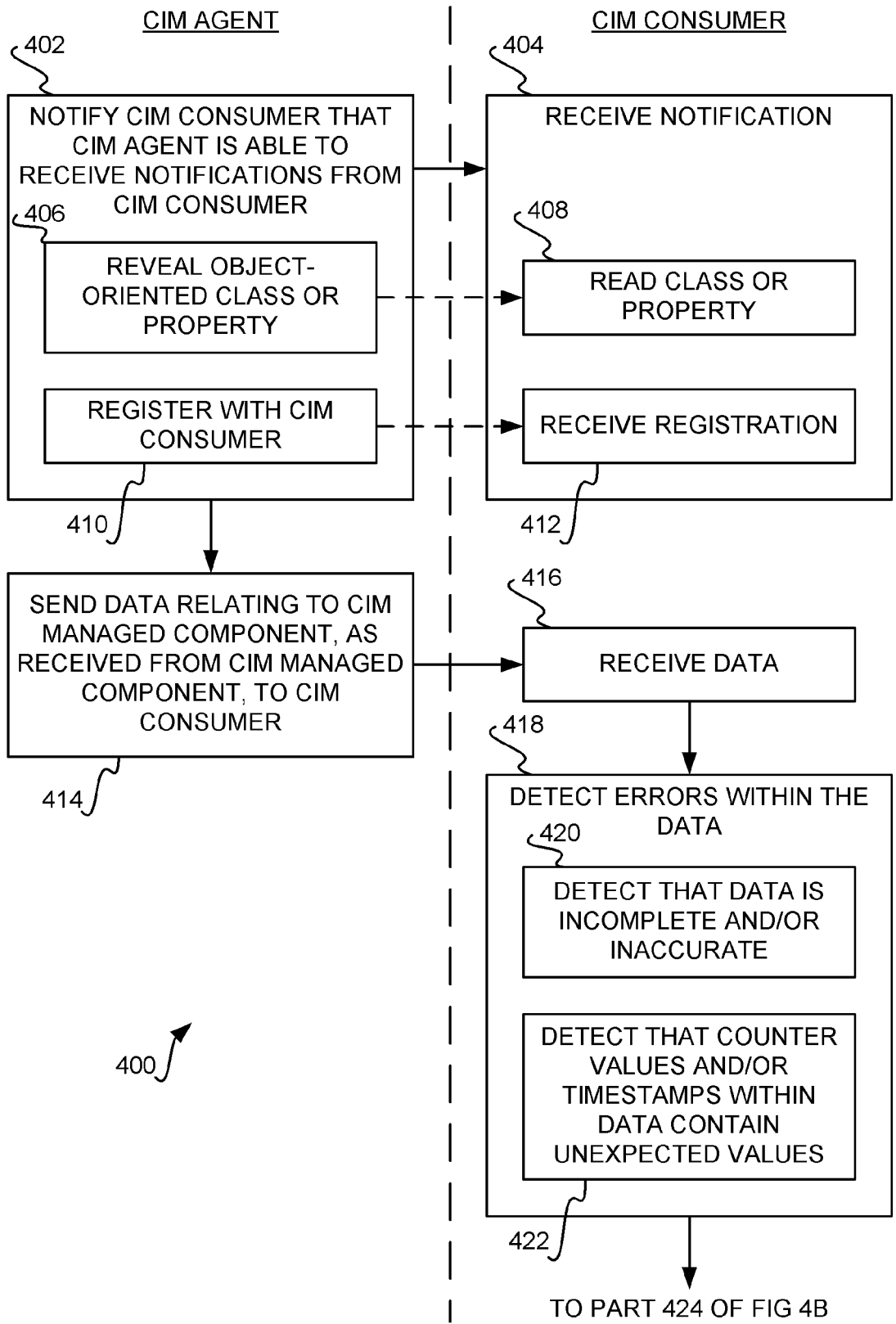

US 8,087,032 B2

AUTOMATED RECOVERY PROCESS INITIATION FOR DATA CONSUMERS OF A COMMON INFORMATION MODEL (CIM) MANAGED COMPONENT

FIELD OF THE INVENTION

The present invention relates generally to the Common Information Model (CIM), in relation to which CIM agents can manage hardware and software components, and more particularly to providing a CIM consumer with a manner by which to initiate an automated recovery process for such a CIM agent, without manual user interaction.

BACKGROUND OF THE INVENTION

The Common Information Model (CIM) is an open standard that defines how managed components within an information technology (IT) environment are represented as a common set of objects, and also defines relationships among these managed components. The CIM is intended to allow consistent management of such components, independent of their manufacturer or provider. By using CIM implementations, management software can be written once to work with many implementations without complex and costly conversion operations or loss of information as components are added to or removed from an IT environment. The CIM standard is defined and published by the Distributed Management Task Force (DTMF), Inc., of Portland, Oreg., which maintains an Internet presence at the uniform resource locator (URL) address www.dmtf.org.

A CIM agent retrieves data relating to CIM managed components, from the CIM managed components, and to send this data to CIM consumers when requested. This data may include performance statistics, health, configuration and other information that may be of interest to ascertain that a CIM managed component is operating properly, or to otherwise monitor the CIM managed component. A CIM consumer is any type of application that receives this data for such purposes. For instance, a CIM consumer may be management software, another type of computer program or client, and so on.

The data propagation path between a CIM agent and a CIM consumer is typically one way—in response to data requests sent to the CIM agent from a CIM consumer, data is propagated by the CIM agent to the CIM consumer and received by the CIM consumer from the CIM agent. The CIM consumer, however, is unable to notify the CIM agent that the data relating to a CIM managed component and received from the CIM agent contains errors; that is, the CIM consumer is unable to propagate such relevant data back to the CIM agent. As such, the CIM agent is unable to automatically and without manual user interaction initiate an automated recovery process by which the CIM agent can attempt to discern the cause of these errors, and/or otherwise acquire additional information that may shed light on the cause of the errors.

Rather, within the prior art, the CIM consumer can at best alert a user like a system administrator. Upon receiving the alert, the system administrator can manually force the CIM agent to perform a recovery process. This manual interaction by a user, however, can be inconvenient and time-consuming. For example, the user may not be able to ascertain the cause of the errors without first forcing the CIM agent to acquire additional information and then waiting for this additional information to be acquired. As another example, the window of time in which pertinent information regarding the CIM agent can be used to determine why the CIM consumer is reporting an error can be relatively short; as such, manual intervention by a system administrator may not occur quickly enough to capture the pertinent information. As a third example, the recovery process may be relatively trivial, such that the user's time and focus are wasted in having to manually initiate this process.

For these and other reasons, there is a need for the present invention.

SUMMARY OF THE INVENTION

The present invention relates generally to initiating an automated recovery process for a Common Information Model (CIM) agent used to manage components, like a hardware component or a software component. A method of an embodiment of the invention includes CIM agent software notifying CIM consumer software that the CIM agent software is able to receive notifications from the CIM consumer software relating to errors within data sent by the CIM agent software to the CIM consumer software. The data relates to the CIM managed component. The CIM consumer software receives the data, and detects whether the data contains errors. If the CIM consumer software detects that the data contains errors, the CIM consumer software notifies the CIM agent software that the data contains errors. In response, the CIM agent software can initiate an automated recovery process in relation to the CIM managed component, without manual user interaction.

An article of manufacture of an embodiment of the invention includes a computer-readable medium and means in the medium. The computer-readable medium may be a recordable data storage medium, or another type of tangible computer-readable medium. The means in the medium may be one or more computer programs executable by one or more processors of a computing device. The means receives data relating to the CIM managed component, from CIM agent software. The means detects that the data contains errors, and in response notifies the CIM agent software. The CIM agent software in response to being notified can initiate an automated recovery process in relation to the CIM managed component, without manual user interaction.

An article of manufacture of another embodiment of the invention also includes a computer-readable medium and means in the medium, where the medium may be a recordable data storage medium, or another type of tangible computer-readable medium, and where the means may be one or more computer programs executable by one or more processors of a computing device. The means notifies CIM consumer software that it is able to receive notifications from the CIM consumer software relating to errors within data sent by the means to the CIM consumer software. The data relates to the CIM managed component. The means sends the data to the CIM consumer software, and in response to receiving notification from the CIM consumer software that the data contains errors, initiates an automated recovery process in relation to the CIM managed component, without manual user interaction.

A system of an embodiment of the invention includes a processor, a memory storing software executable by the processor, the CIM managed component, a CIM consumer, and a CIM agent. The CIM management component is one of a hardware component and a component. The CIM consumer receives data relating to the CIM managed component and detects whether the data contains errors. The CIM agent sends the data to the CIM consumer and notifies the CIM consumer that it is able to receive notifications from the CIM consumer that the data contains errors. In response to the CIM consumer detecting that the data contains errors, the CIM consumer notifies the CIM agent, which in response initiates an automated recovery process in relation to the CIM managed component without manual user interaction. In one embodiment, a CIM consumer means corresponds to the CIM consumer and a CIM agent means correspond to the CIM agent. One or more of the CIM consumer and the CIM agent are each implemented by the software stored on the memory that is executable by the processor.

Still other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 4A and 4B are flowcharts of a method that is more detailed than but consistent with the method of FIG. 1, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
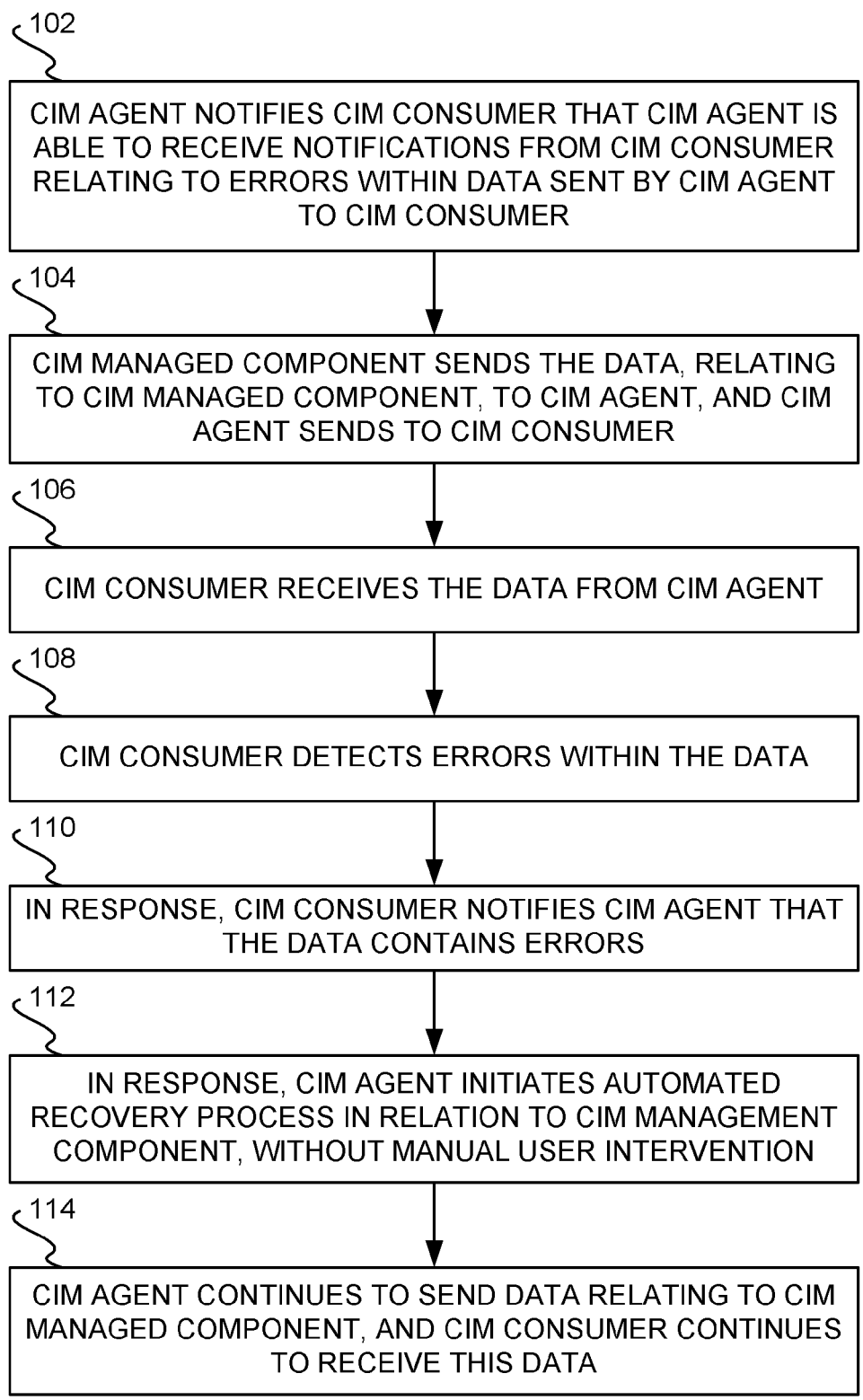
FIG. 1 is a flowchart of a method, according to an embodiment of the invention.

FIG. 1 shows a method 100, according to an embodiment of the invention. The method 100 is operable in the context of the Common Information Model (CIM). The method 100 is described in general terms in this section of the detailed description, to provide an overview of an embodiment of the invention. In a subsequent section of the detailed description, more specific details are provided for the method 100.

Within the method 100, there are three actor components: a CIM managed component, a CIM agent, and a CIM consumer. The CIM agent may also be referred to as CIM agent software, because the CIM agent can be implemented at least in software; the CIM agent may also be implemented in hardware as well as in software. Likewise, the CIM consumer may also be referred to as CIM consumer software, because the CIM consumer can be implemented at least in software; the CIM consumer may also be implemented in hardware as well as in software.

The CIM managed component is a hardware component or a software component that is to be managed in accordance with the CIM, as can be appreciated by those of ordinary skill within the art. The CIM managed component may be, for instance, a storage device like a hard disk drive, or a number of hard disk drives organized within an array. The CIM managed component sends data regarding itself to the CIM agent. This data may include performance, health, and other information that may be of interest to ascertain that a CIM managed component is operating properly, or to otherwise monitor the CIM managed component.

The CIM agent receives the data sent by the CIM managed component. In turn, the CIM agent sends this data to the CIM consumer. This data is said to be related to the CIM managed component. The CIM consumer is any type of application that receives the data relating to the CIM managed component for monitoring or other purposes. For example, a CIM consumer may be management software, another type of computer program or client, and so on.

In the method 100, the CIM agent notifies the CIM consumer that it is able to receive notifications from the CIM consumer that relate to errors within data sent by the CIM agent to the CIM consumer (102). As has been described in the background section, within the prior art the communication path between a CIM agent and a CIM consumer is one way—data is sent by the CIM agent to the CIM consumer, and not from the CIM consumer to the CIM agent. By comparison, in embodiments of the invention, the CIM agent can also receive information sent by the CIM consumer. Therefore, the CIM agent notifies the CIM consumer in part 102 to alert the CIM consumer that it is able to receive information, specifically notifications that relate to errors within data that was sent by the CIM agent to the CIM consumer.

The CIM managed component sends such data, which relates to the CIM managed component as has been described, to the CIM agent, and the CIM agent in turn sends the data to the CIM consumer (104). The CIM consumer thus receives the data relating to the CIM managed component from the CIM agent (106). The CIM consumer detects whether there are any errors within the data (108). Different types of errors that may be present within the data relating to the CIM managed component are described in a later section of the detailed description.

In response to detecting errors within the data, the CIM consumer notifies the CIM agent of this fact (110). It is noted that this is in distinction with the prior art, in which the CIM agent is incapable of receiving such notifications from the CIM consumer It is further noted that in at least some embodiments, the CIM agent having this capability is nevertheless compatible with preexisting CIM consumers that do not send the CIM agent these notifications. That is, while the CIM consumer of embodiments of the invention is written so that it does send the CIM agent such notifications, the CIM agent is nevertheless able to function with other CIM consumers that cannot send notifications to the CIM agent. For example, the CIM agent may be unsuccessful in part 102 in notifying such CIM consumers that it is able to receive notifications from them, such that the CIM agent in such instance functions in accordance with the prior art, and does not receive notifications from these CIM consumers.

In response to receiving the notification from the CIM consumer that errors have been detected within the data, the CIM agent initiates an automated recovery process in relation to the CIM managed component (112). As is described in more detail in a later section of the detailed description, this automated recovery process may entail one or more of two different things. First, the automated recovery process may attempt to discern the cause of these errors, and/or rectify the cause of these errors. Second, the automated recovery process may acquire additional information that may under subsequent review enable a user to learn and/or rectify the cause of the errors.

Importantly, initiation of the automated recovery process in relation to the CIM managed component by the CIM agent is performed without manual user intervention. That is, upon the CIM consumer detecting errors within the data, the user does not have to manually interact with the CIM consumer, the CIM agent, or the CIM managed component in order to initiate the automated recovery process. Rather, the recovery process is completely automated; once the CIM agent receives the notification from the CIM consumer, it automatically initiates the recovery process without manual user intervention. This aspect of embodiments of the invention provides for certain advantages that are described at the end of the detailed description.

It is further noted that after the automated recovery process has been initiated, the CIM agent can continue to receive data from the CIM managed component and to send this data to the CIM consumer, such that the CIM consumer continues to receive this data (114). This, management of the CIM managed component by the CIM agent does not have to cease just because the automated recovery process has been initiated. Instead, such management can continue, including the transmission and collection of data related to the CIM managed component.

Figure 2:
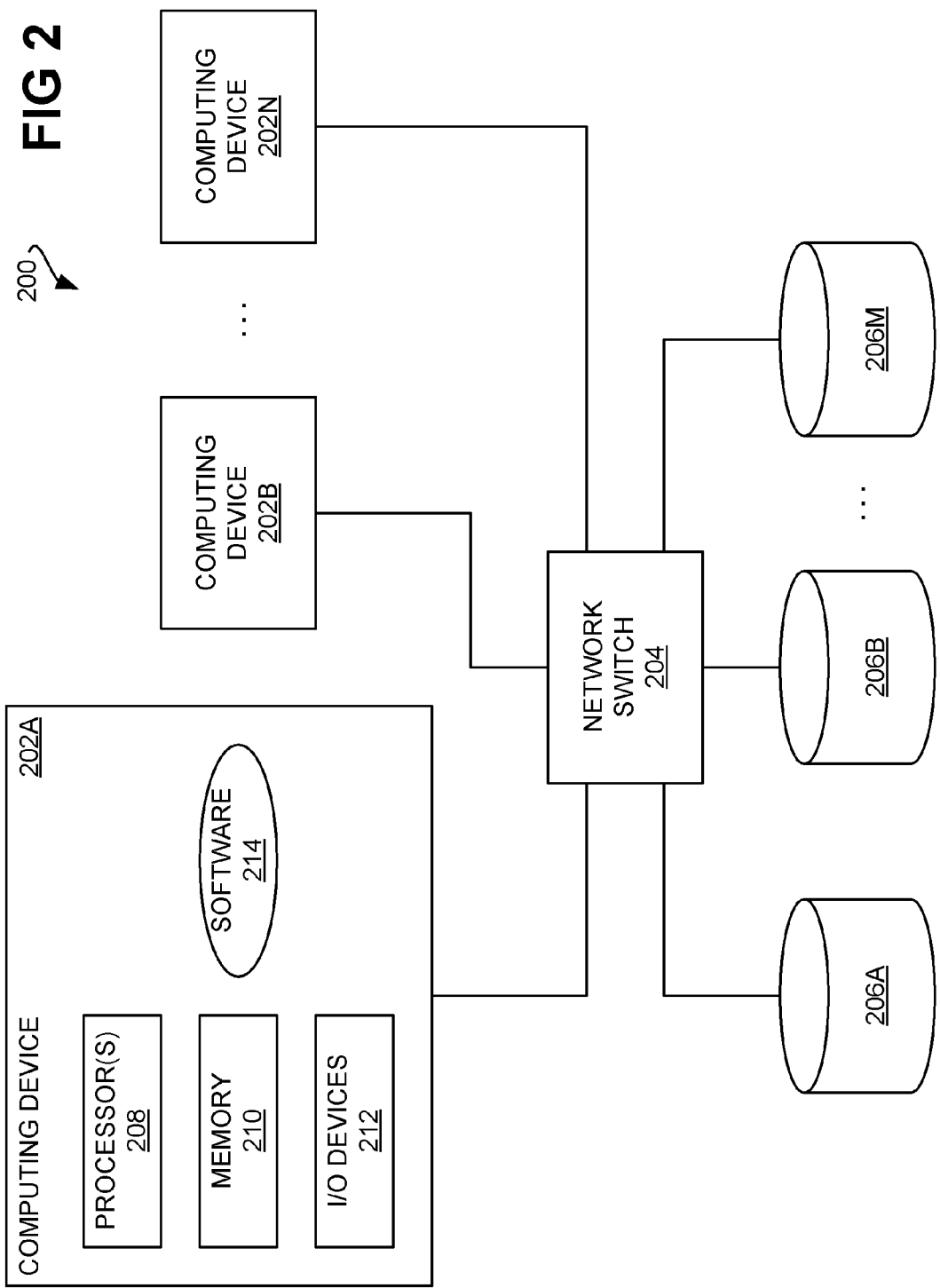
FIG. 2 is a diagram of a representative hardware environment, according to an embodiment of the invention.

FIG. 2 shows a representative hardware environment 200, according to an embodiment of the invention. Those of ordinary skill within the art can appreciate that embodiments of the invention can be implemented in relation to environments other than the hardware environment 200. The hardware environment 200 is presented in FIG. 2 and described herein to provide a sense of an exemplary environment in conjunction within which embodiments of the invention can be practiced.

The hardware environment 200 includes one or more computing devices 202A, 202B, . . . , 202N, collectively referred to as the computing devices 202. The computing devices 202 may be client computing devices, server computing devices, and/or other types of computing devices. The computing devices 202 are interconnected within a network via at least a network switch 204 of the hardware environment 200. The hardware environment 200 also includes one or more storage devices 206A, 206B, . . . , 206M, collectively referred to as the storage devices 206, and which are also connected to the network switch 204.

The computing device 202 is specifically depicted in representative detail in FIG. 2 as including one or more processors 208, memory 210, input/output (I/O) devices 212, and software 214. The memory 210 may be volatile semiconductor memory, such as dynamic random-access memory (DRAM). The I/O devices 212 can include keyboards, pointing devices, display devices, printing devices, and so on. The software 214 may include an operating system (OS), and computer programs that run on the OS, such as application computer programs, as can be appreciated by those of ordinary skill within the art.

The network switch 204 is typically a hardware component that cross-connects the computing devices 202 and the storage devices 206 so that the devices 202 and 206 form one or more networks. The storage devices 206 may be hard disk drives, either independent and separate disk drives, or drives that are organized within an array, such as a redundant array of independent disks (RAID) and/or a storage-area network (SAN). The computing devices 202 thus communicate with one another and with the storage devices 206 over the network switch 204 in one embodiment.

Figure 3:
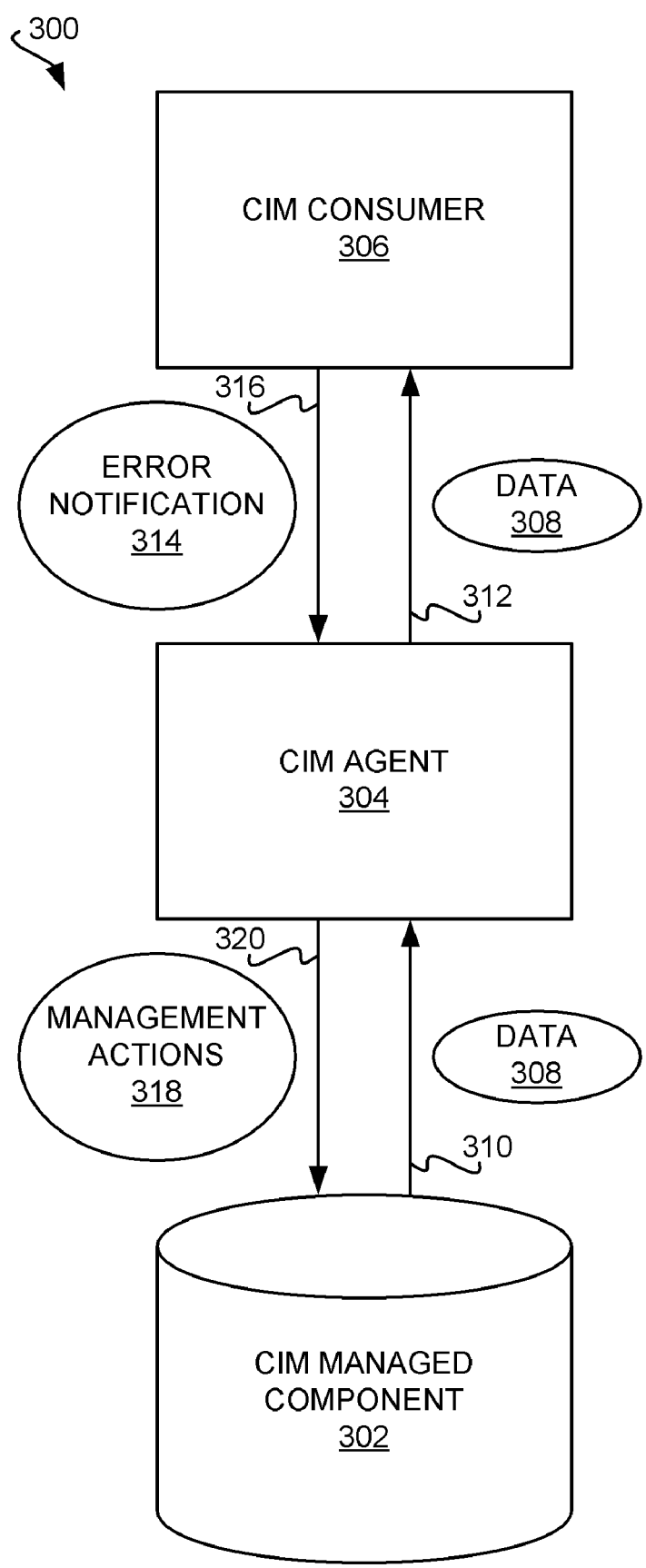
FIG. 3 is a diagram of a simplified implementation of the Common Information Model (CIM), according to an embodiment of the invention.

FIG. 3 shows a simplified implementation 300 of an embodiment of the invention. The implementation of the CIM 300 includes a CIM managed component 302, a CIM agent 304, and a CIM consumer 306. The CIM managed component 302 is exemplarily depicted as being a hard disk drive, such as one or more of the hard disk drives 206 of FIG. 2. However, the CIM managed component 302 may be another hardware component, such as one of the computing devices 202, or just the processors 208, the memory 210, or the I/O devices 212 of one of the computing devices 202. The CIM managed component 302 may also be a software component, such as one of the pieces of software 214 running on one of the computing devices 202.

The CIM agent 304 is implemented at least in software, and runs on one of the computing devices 202. Likewise, the CIM consumer 306 is implemented at least in software, and runs on one of the computing devices 202. The CIM agent 304 and the CIM consumer 306 can run on the same computing device, or on different computing devices, as can be appreciated by those of ordinary skill within the art.

The CIM managed component 302 sends data 308 relating to itself to the CIM agent 304, as indicated by the arrow 310. In turn, the CIM agent 304 sends the data 308 to the CIM consumer 306, as indicated by the arrow 312. The CIM consumer 306 may detect errors within the data 308. In response, the CIM consumer 306 can send an error notification 314 to the CIM agent 304, as indicated by the arrow 316. Upon receiving the error notification 314, the CIM agent 304 may initiate an automated recovery process.

Such an automated recovery process may include causing one or more management-related actions 318 to be performed by the CIM agent 304 with respect to the CIM managed component 302, as indicated by the arrow 320. However, the management-related actions 318 can include other types of actions normally performed within the CIM by the CIM agent 304 in relation to the CIM managed component 302. That is, the actions 318 include, but do not only consist of, initiation of the automated recovery process in some embodiments of the invention.

A primary distinction between embodiments of the invention and the prior art is the ability for the CIM consumer 306 to send information to the CIM agent 304, as denoted by the arrow 316, in addition to receiving information from the CIM agent 304, as denoted by the arrow 312. As has been described, within the prior art, implementations of the CIM are such that the CIM consumer 306 particularly has no way to send notifications regarding errors detected within the data 308 to the CIM agent 304. By comparison, within embodiments of the invention, the CIM consumer 306 is able to send notifications regarding errors detected within the data 308 to the CIM agent 304.

Figure 4B:
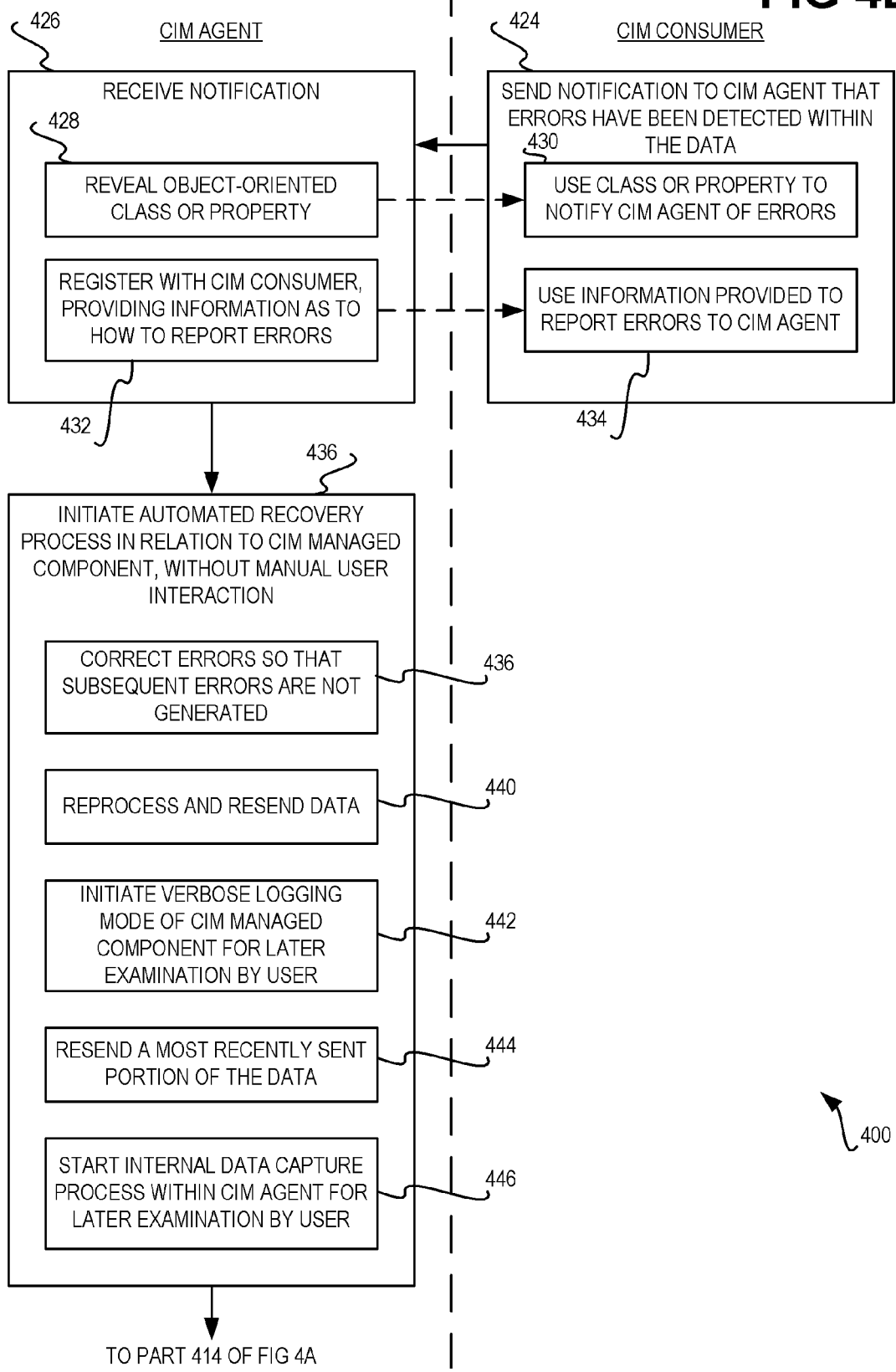

FIGS. 4A and 4B show a method 400, according to an embodiment of the invention. The method 400 is more detailed than but consistent with the method 100 of FIG. 1 that has been described. The parts of the method 400 within the left-hand column of FIGS. 4A and 4B are performed by a Common Information Model (CIM) agent, and the parts within the right-hand column are performed by a CIM consumer.

The parts of the method 400 within the left-hand column of FIGS. 4A and 4B may be implemented as one or more computer programs stored on a computer-readable medium of an article of manufacture, and executed by one or more processors. Likewise, the parts within the right-hand column may be implemented as one or more computer programs stored on a computer-readable medium of an article of manufacture, and executed by one or more processors. For instance, the computer-readable medium may be a recordable data storage medium, or another type of tangible computer-readable-medium.

The CIM agent notifies the CIM consumer that it is able to receive notifications from the CIM consumer (402), and the CIM consumer receives this notification from the CIM agent (404). In one embodiment, this is achieved by the CIM agent revealing a CIM class or property (406) that is then read by the CIM consumer (408). Those of ordinary skill within the art can appreciate that a CIM class or property is a user-defined data type that defines a collection of objects that share the same characteristics. The class or property indicates that the CIM agent is able to receive notifications from the CIM consumer, particularly those relating to errors within the data relating to a CIM managed component. Thus, if the CIM consumer is able to read a predetermined class or property revealed by the CIM agent, then the CIM consumer becomes aware that the CIM agent is capable of receiving notifications sent by the CIM consumer.

In another embodiment, the CIM agent notifies the CIM consumer in parts 402 and 404 via the CIM agent 410 registering with the CIM consumer (410), which receives this registration from the CIM agent (412). For example, the CIM consumer may expose a CIM method that the CIM agent attempts to call to convey to the CIM consumer that the CIM agent is able to receive notifications sent by the CIM consumer. In this embodiment, the CIM agent may provide information to the CIM consumer as to how the CIM consumer should send notifications to the CIM agent. For example, the CIM agent may identify its own method that the CIM consumer should call to send notifications to the CIM agent.

In this latter embodiment, it is noted that with respect to the CIM agent notifying the CIM consumer that it is able to receive notifications from the CIM consumer, the CIM agent becomes a client of the CIM consumer, where the CIM consumer is a server to the CIM agent. This is different than the ordinary relationship between the CIM agent and the CIM consumer. Ordinarily, the CIM agent is a server to the CIM consumer, which is a client, such as when data relating to the CIM managed object is being sent by the CIM agent to the CIM consumer.

The CIM agent sends data relating to the CIM managed component, as received from the CIM managed component, to the CIM consumer (414), which receives the data (416). The CIM consumer then detects whether the data contains errors (418). In one embodiment, the CIM consumer may perform this detection by detecting whether the data is incomplete and/or inaccurate (420). For example, the CIM consumer may expect that it receive data regarding the CIM managed component every equally spaced time interval $t_1, t_2, \ldots, t_N$. If data is not received for a given time interval, then the data is incomplete. As another example, the CIM consumer may expect that it receive data regarding the current operating temperature of the CIM managed component. If this data indicates an obviously erroneous operating temperature of the CIM managed component—such as −100° C. for instance—then the data is inaccurate.

In another embodiment, the CIM consumer may perform the error detection of part 418 by detecting that counter values and/or timestamps within the data contain unexpected values (422). For example, the pieces of data received by the CIM consumer may have counter values that are incremented from one piece of data to another. As such, the most recently received piece of data should have a counter value that is greater than that of a previously received piece of data. However, the counter may have a maximum value, at which point the counter rolls over to an initial value of zero. If the CIM consumer is not expecting this, then the most recently received piece of data will have a counter value that is less than that of a previously received piece of data, such that it is said that the counter values are unexpected.

As another example, the pieces of data received by the CIM consumer may have timestamps as to when the data in question was generated at or by the CIM managed component. As such, the most recently received piece of data should have a timestamp that is later in time than that of a previously received piece of data, and the timestamp of any received piece of data should occur in the past in relation to the clock of the CIM consumer itself. However, time zone differences, unsynchronized clocks, incorrectly set clocks, and so on, can cause either of these two conditions to not be satisfied, such that it is said that the timestamp values are correspondingly unexpected.

In response to detecting that the data contains errors, the CIM consumer sends a notification to the CIM agent that errors have been detected within the data (424), and the CIM agent receives this notification (426). In one embodiment, this is achieved by the CIM agent revealing a CIM class or property (428) that is used by the CIM consumer to notify the CIM agent of errors (430). The class or property in parts 428 and 430 can be different than the class or property described in parts 406 and 408, is a class or property by which the CIM consumer is able to notify the CIM agent that errors have been detected within the data. For example, an instance of this class or property may be set to TRUE from FALSE, may be incremented by one, and so on, by the CIM consumer to notify the CIM agent that errors have been detected within the data.

In another embodiment, the CIM consumer notifies the CIM agent in parts 424 and 426 that errors have been detected within the data via the CIM agent having previously registered with the CIM consumer (432), and the CIM consumer using the information provided during this previous registration to notify the CIM agent (434). The registration by the CIM agent with the CIM consumer may be the same registration performed in parts 410 and 412. During registration, the CIM agent may identify a method that the CIM consumer is to call to notify the CIM agent that the CIM consumer has detected errors within the data. Thus, the CIM consumer calls this identified method to notify the CIM agent that the CIM consumer has detected errors within the data.

In response to receiving notification from the CIM consumer that the CIM consumer has detected errors within the data, the CIM agent initiates an automated recovery process in relation to the CIM managed component in question, without manual user interaction (436). In one embodiment, the CIM agent may simply correct the errors (i.e., the cause of the errors) so that subsequent errors are not generated within the data (438). For example, if clocks are unsynchronized, or there are time zone differences, corrections to the clocks can easily be made by the CIM agent to ensure that errors resulting from unsynchronized clocks or time zone differences do not occur again.

In one embodiment, the CIM agent reprocesses the data and resends the data to the CIM consumer (440). For example, the errors within the data may have resulted from a non-reoccurring processing failure within the CIM agent. Therefore, the CIM agent can reprocess the raw data received from the CIM managed component and resend this reprocessed data to the CIM consumer, correcting the errors within the data.

In one embodiment, the CIM agent initiates a verbose logging mode of the CIM managed component, so that a user can subsequently examine a detailed log to determine the cause of the errors within the data (442). For example, ordinarily the log file that may be created to log metadata regarding the data that is generated by the CIM managed component and ultimately received by the CIM consumer may have insufficient detail to permit even an experienced user to determine why the errors are being generated within the data. Therefore, even if the user is aware that the errors are occurring, he or she will be unable to determine their cause. Therefore, the CIM agent may initiate a verbose logging mode in which substantially more information is logged regarding the data that is generated by the CIM managed component. Once sufficient such information has been tabulated, the CIM agent may notify the user that he or she should review the log to ascertain why the errors are occurring.

In one embodiment, the CIM agent resends a most recently sent portion of the data relating to the CIM managed component to the CIM consumer (444). For example, it may be presumed that the reason why the CIM consumer detected errors within the data is that the data became corrupted during communication from the CIM agent to the CIM consumer. Therefore, the CIM agent may decide to just resend the most recently sent portion of the data, in the hope that corruption of the data will not occur again, such that the CIM consumer will not detect any errors within the data as resent.

In one embodiment, the CIM agent starts an internal data capture process within the CIM agent software itself, so that a user can subsequently examine this internal data captured from within the CIM agent to determine the cause of the errors within the data (446). Part 446 of the method 400 is thus similar to part 442 that has been described. However, in part 442 the information that is captured is log information obtained by turning on the verbose logging mode that may be available with the CIM of which the CIM agent and the CIM managed component are parts. By comparison, in part 446 the information that is captured may be non-log information. Furthermore, in part 442 the log information that is captured may pertain to all aspects of the data collection process, from the raw data generated by the CIM managed component to the processed data generated by the CIM agent. By comparison, in part 446 the information that is captured may be particular to just the processing of the data within the CIM agent itself, to provide further details as to how the CIM agent is processing the data, and whether it is processing the data correctly.

Once the automated recovery process has been initiated, the method 400 may be repeated at part 414, where further data relating to the CIM managed component is again sent to the CIM consumer. Thus as has been described, even while the recovery process is ongoing, management of the CIM managed component does not cease. This is because even while the recovery process is ongoing, data relating to the CIM management component is still sent by the CIM agent to the CIM consumer.

Embodiments of the invention as have been described herein provide for advantages over the prior art. Within the prior art, bidirectional data propagation between a CIM consumer and a CIM agent is generally not permitted. Thus, if the CIM consumer detects errors within the data relating to a CIM managed component as received from the CIM agent, the CIM consumer has no way of notifying the CIM agent of this fact. Therefore, the CIM agent cannot initiate any type of automated recovery process in response. Rather, at best, the CIM consumer has to notify a user, who may then manually initiate a recovery process, potentially wasting the time and focus of the user and being inconvenient to the user.

By comparison, embodiments of the invention provide for bidirectional communication between a CIM consumer and a CIM agent. If the CIM consumer detects errors within the data relating to a CIM managed component as received from the CIM agent, the CIM consumer thus can notify the CIM agent of this fact. As such, the CIM agent can initiate an automated recovery process in response. The automated recovery process does not require any manual user interaction. Therefore, the time and focus of the user are not wasted, and the user is spared inconvenience.

It is ultimately noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
a Common Information Model (CIM) agent notifying a CIM consumer that the CIM agent is able to receive notifications from the CIM consumer relating to errors within data sent by the CIM agent to the CIM consumer, the data relating to a CIM managed component;
the CIM consumer receiving the data relating to the CIM managed component, from the CIM agent, the CIM managed component being one of a hardware component and a component;
in response to the CIM consumer detecting that the data relating to the CIM managed component and received from the CIM agent contains errors,
the CIM consumer notifying the CIM agent that the data relating to the CIM managed component and received from the CIM agent contains errors;
in response, the CIM agent initiating an automated recovery process in relation to the CIM managed component, without manual user interaction.

2. The method of claim 1, further comprising, after the CIM agent has initiated the automated recovery process in relation to the CIM managed component, the CIM consumer continuing to receive the data relating to the CIM managed component, from the CIM agent.

3. The method of claim 1, further comprising the CIM managed component sending the data to the CIM agent, and the CIM agent sending the data to the CIM consumer.

4. The method of claim 1, wherein the CIM agent notifying the CIM consumer that the CIM agent is able to receive notifications from the CIM consumer relating to errors within data sent by the CIM agent to the CIM consumer relating to the CIM managed component comprises:
the CIM agent revealing one or more of a CIM class and a CIM property indicating that the CIM agent is able to receive notifications from the CIM consumer relating to errors within data sent by the CIM agent to the CIM consumer relating to the CIM managed component; and,
the CIM consumer reading the one or more of the CIM class and the object-oriented property such that the CIM consumer is notified that the CIM agent is able to receive notifications from the CIM consumer relating to errors within data sent by the CIM agent to the CIM consumer relating to the CIM managed component.

5. The method of claim 1, wherein the CIM agent notifying the CIM consumer that the CIM agent is able to receive notifications from the CIM consumer relating to errors within data sent by the CIM agent to the CIM consumer relating to the CIM managed component comprises:
the CIM agent registering with the CIM consumer to notify the CIM consumer that the CIM agent is able to receive notifications from the CIM consumer relating to errors within data sent by the CIM agent to the CIM consumer relating to the CIM managed component.

6. The method of claim 5, wherein the CIM agent registering with the CIM consumer is such that the CIM consumer becomes a server in relation to which the CIM agent is a client, as to notification from the CIM agent to the CIM consumer that the CIM agent is able to receive notifications from the CIM consumer relating to errors within data sent by the CIM agent to the CIM consumer relating to the CIM managed component.

7. The method of claim 6, wherein except for the CIM agent registering with the CIM consumer, the CIM consumer is a client in relation to the CIM agent.

8. The method of claim 1, wherein the CIM consumer detecting that the data relating to the CIM managed component and received from the CIM agent contains error comprises:
the CIM consumer detecting that the data is incomplete.

9. The method of claim 1, wherein the CIM consumer detecting that the data relating to the CIM managed component and received from the CIM agent contains error comprises:
the CIM consumer detecting that the data is inaccurate.

10. The method of claim 1, wherein the CIM consumer detecting that the data relating to the CIM managed component and received from the CIM agent contains error comprises:
the CIM consumer detecting that counter values within the data contain unexpected values.

11. The method of claim 1, wherein the CIM consumer detecting that the data relating to the CIM managed component and received from the CIM agent contains error comprises:
the CIM consumer detecting that timestamps within the data contain unexpected values.

12. The method of claim 1, wherein the CIM consumer notifying the CIM agent that the data relating to the CIM managed component and received from the CIM agent contains errors comprises:
the CIM agent revealing one or more of a CIM class and a CIM property by which the CIM agent is able to receive notifications from the CIM consumer that the data relating to the CIM managed component and received from the CIM agent contains errors; and,
the CIM consumer using the one or more of the CIM class and the CIM property to notify the CIM agent that the data relating to the CIM managed component and received from the CIM agent contains errors.

13. The method of claim 1, wherein the CIM consumer notifying the CIM agent that the data relating to the CIM managed component and received from the CIM agent contains errors comprises:
the CIM agent registering with the CIM consumer to notify the CIM consumer by which the CIM agent is able to receive notifications from the CIM consumer that the data relating to the CIM managed component and received from the CIM agent contains errors; and,
the CIM consumer notifying the CIM agent that the data relating to the CIM managed component and received from the CIM agent contains errors based on information previously provided by the CIM agent during registration with the CIM consumer.

14. The method of claim 1, wherein the CIM agent initiating an automated recovery process in relation to the CIM managed component, without manual user interaction, comprises:
the CIM agent initiating a recovery process on the CIM managed component so that subsequent errors are not generated within the data relating to the CIM managed component.

15. The method of claim 1, wherein the CIM agent initiating an automated recovery process in relation to the CIM managed component, without manual user interaction, comprises:
the CIM agent reprocessing the data relating to the CIM managed component to correct the errors.

16. The method of claim 1, wherein the CIM agent initiating an automated recovery process in relation to the CIM managed component, without manual user interaction, comprises:
the CIM agent initiating a verbose logging mode of the CIM managed component, so that a user can subsequently examine a detailed log to determine a cause of the errors.

17. The method of claim 1, wherein the CIM agent initiating an automated recovery process in relation to the CIM managed component, without manual user interaction, comprises:
the CIM agent resending to the CIM consumer a most recently sent portion of the data relating to the CIM managed component.

18. The method of claim 1, wherein the CIM agent initiating an automated recovery process in relation to the CIM managed component, without manual user interaction, comprises:
the CIM agent starting an internal data capture process within the CIM agent itself, so that a user can subsequently examine the internal data captured from within the CIM agent to determine a cause of the errors.

19. An article of manufacture comprising:
a computer-readable medium; and,
means in the medium for:
receiving data relating to a Common Information Model (CIM) managed component, from a CIM agent, the CIM managed component being one of a hardware component and a component;
detecting that the data relating to the CIM managed component and received from the CIM agent contains errors; and,
in response, notifying the CIM agent that the data relating to the CIM managed component and received from the CIM agent contains errors,
wherein the CIM agent, in response to being notified, initiates an automated recovery process in relation to the CIM managed component, without manual user interaction.

20. The article of manufacture of claim 19, wherein the means is further for receiving notification from the CIM agent that the CIM agent is able to receive notifications relating to errors within the data sent by the CIM agent and relating to the CIM managed component.

21. The article of manufacture of claim 20, wherein the means is to receive notification from the CIM agent that the CIM agent is able to receive notifications relating to errors within the data sent by the CIM agent and relating to the CIM managed component, by one of:
reading one or more of an object-oriented class and an object-oriented property indicating that the CIM agent is able to receive notifications relating to errors within the data sent by the CIM agent and relating to the CIM managed component; and,
receiving registration from the CIM agent, the registration indicating that the CIM agent is able to receive notifications relating to errors within the data sent by the CIM agent and relating to the CIM managed component.

22. The article of manufacture of claim 19, wherein the means is further for continuing to receive the data relating to the CIM managed component, from the CIM agent, after the CIM agent has initiated the automated recovery process in relation to the CIM managed component.

23. The article of manufacture of claim 19, wherein the means is to detecting that the data relating to the CIM managed component and received from the CIM agent contains errors by one or more of:
  detecting that the data is incomplete;
  detecting that the data is inaccurate;
  detecting that counter values within the data contain unexpected values; and,
  detecting that timestamps within the data contain unexpected values.

24. The article of manufacture of claim 19, wherein the means is to notify the CIM agent that the data relating to the CIM managed component and received from the CIM agent contains errors by one of:
  using one or more of an object-oriented class and an object-oriented property revealed by the CIM agent to notify the CIM agent that the data relating to the CIM managed component and received from the CIM agent contains errors; and,
  receiving registration from the CIM agent such that the CIM agent provides information on which basis the CIM agent is notified that the data relating to the CIM managed component and received from the CIM agent contains errors.

25. An article of manufacture comprising:
  a computer-readable medium; and,
  means in the medium for:
    notifying a Common Information Model (CIM) consumer that the means is able to receive notifications from the CIM consumer relating to errors within data sent by the means to the CIM consumer, the data relating to a CIM managed component;
    sending the data relating to the CIM managed component to the CIM consumer, the CIM managed component being one of a hardware component and a component;
    receiving notification from the CIM consumer that the data relating to the CIM managed component contains errors; and,
    in response, initiating an automated recovery process in relation to the CIM managed component, without manual user interaction.

26. The article of manufacture of claim 25, wherein the means is further for continuing to send the data relating to the CIM managed component to the CIM consumer, after the automated recovery process has been initiated in relation to the CIM managed component.

27. The article of manufacture of claim 25, wherein the means is to notify the CIM consumer that the means is able to receive notifications from the CIM consumer relating to errors within data sent by the means to the CIM consumer relating to a CIM managed component, by one of:
  revealing one or more of an object-oriented class and an object-oriented property indicating that the means is able to receive notifications from the CIM consumer relating to errors within data sent by the means to the CIM consumer relating to a CIM managed component; and,
  registering with the CIM consumer to notify the CIM consumer that the means is able to receive notifications from the CIM consumer relating to errors within data sent by the means to the CIM consumer relating to a CIM managed component.

28. The article of manufacture of claim 25, wherein the means is to receive notification from the CIM consumer that the data relating to the CIM managed component contains errors, by one of:
  revealing one or more of an object-oriented class and an object-oriented property by which the means is able to receive notification from the CIM consumer that the data relating to the CIM managed component contains errors; and,
  registering with the CIM consumer, such that the CIM agent notifies the means that the data relating to the CIM managed component based on information provided by the means during registration with the CIM consumer.

29. The article of manufacture of claim 25, wherein the means is to initiate an automated recovery process in relation to the CIM managed component, without manual user interaction, by one or more of:
  initiating a recovery process on the CIM managed component so that subsequent errors are not generated within the data relating to the CIM managed component;
  reprocessing the data relating to the CIM managed component to correct the errors;
  initiating a verbose logging mode of the CIM managed component, so that a user can subsequently examine a detailed log to determine a cause of the errors;
  resending to the CIM consumer a most recently sent portion of the data relating to the CIM managed component; and,
  starting an internal data capture process within the means itself, so that a user can subsequently examine the internal data captured from within the means to determine a cause of the errors.

30. A system comprising:
  a processor;
  a memory storing software executable by the processor;
  a Common Information Model (CIM) managed component, the CIM managed component being one of a hardware component and a component;
  a CIM consumer to receive data relating to the CIM managed component and to detect whether the data contains errors; and,
  a CIM agent to send the data relating to the CIM managed component to the CIM consumer and to notify the CIM consumer that the CIM agent is able to receive notifications from the CIM consumer that the data contains errors,
  wherein in response to the CIM consumer detecting that the data contains errors, the CIM consumer notifies the CIM agent, and in response the CIM agent initiates an automated recovery process in relation to the CIM managed component without manual user interaction,
  and wherein one or more of the CIM consumer and the CIM agent are each implemented by the software stored on the memory that is executable by the processor.

31. The system of claim 30, wherein the CIM agent is to continue to send the data relating to the CIM managed component to the CIM consumer after the CIM agent has initiated the automated recovery process.

32. The system of claim 30, wherein the CIM agent is to reveal one or more of an object-oriented class and an object-oriented property for one or more of:
  indicating that the CIM agent is able to receive notifications from the CIM consumer that the data relating to the CIM managed component contains errors; and, receiving notifications from the CIM consumer that the data relating to the CIM managed component contains errors.

33. The system of claim 30, wherein the CIM agent is to register with the CIM consumer for one or more of:
notifying the CIM consumer that the CIM agent is able to receive notifications from the CIM consumer that the data relating to the CIM managed component contains errors; and,
receiving notifications from the CIM consumer that the data relating to the CIM managed component contains errors.

34. A system comprising:
a processor;
a memory storing software executable by the processor;
a Common Information Model (CIM) managed component, the CIM managed component being one of a hardware component and a component;
CIM consumer means for receiving data relating to the CIM managed component and for detecting whether the data contains errors; and,
CIM agent means for sending the data relating to the CIM managed component to the CIM consumer means, for notifying the CIM consumer means that the CIM agent means is able to receive notifications from the CIM consumer means that the data contains errors, and for initiating an automated recovery process in relation to the CIM managed component without manual user interaction,
wherein the CIM consumer means is further for, in response to detecting that the data contains errors, notifying the CIM agent means, such that the CIM agent means in response initiates the automated recovery process,
and wherein one or more of the CIM consumer means and the CIM agent means are each implemented by the software stored on the memory that is executable by the processor.

\* \* \* \* \*